United States Patent [19]
Katz et al.

[11] Patent Number: 5,663,549
[45] Date of Patent: Sep. 2, 1997

[54] SYSTEM FOR READING A SYMBOL BY ACTIVITATING A LIQUID CRYSTAL DEVICE TO CONTROL A SCANNING PATH

[75] Inventors: Joseph Katz, Stony Brook; Boris Metlitsky, Mt. Sinar, both of N.Y.; Emanuel Marom, Tel Aviv, Israel

[73] Assignee: Symbol Technologies, Inc., Holtsville, N.Y.

[21] Appl. No.: 459,467

[22] Filed: Jun. 2, 1995

Related U.S. Application Data

[62] Division of Ser. No. 98,991, Jul. 29, 1993, Pat. No. 5,545,886, which is a division of Ser. No. 864,367, Apr. 6, 1992, Pat. No. 5,258,605, which is a continuation of Ser. No. 493,134, Mar. 13, 1990, abandoned.

[51] Int. Cl.$^6$ ............................................. G06K 7/10
[52] U.S. Cl. ..................... 235/462; 235/470; 235/455; 250/205
[58] Field of Search ............................. 235/470, 462, 235/455; 250/205

[56] References Cited

U.S. PATENT DOCUMENTS

| | | |
|---|---|---|
| 3,812,325 | 5/1974 | Schmidt . |
| 3,819,910 | 6/1974 | Scantlin . |
| 3,946,205 | 3/1976 | Melugin et al. . |
| 4,040,740 | 8/1977 | Handtmam et al. . |
| 4,057,784 | 11/1977 | Tafoya . |
| 4,135,663 | 1/1979 | Nojiri et al. . |
| 4,195,772 | 4/1980 | Nishimura . |
| 4,217,487 | 8/1980 | Kjeer . |
| 4,251,798 | 2/1981 | Swartz et al. . |
| 4,315,245 | 2/1982 | Nakahara et al. . |
| 4,342,906 | 8/1982 | Hyatt ........................................ 250/205 |
| 4,369,361 | 1/1983 | Swartz et al. . |
| 4,387,297 | 6/1983 | Swartz et al. . |
| 4,409,470 | 10/1983 | Shepard et al. . |

(List continued on next page.)

FOREIGN PATENT DOCUMENTS

| | | |
|---|---|---|
| 62-150486 | 7/1987 | Japan . |
| 63-198177 | 8/1988 | Japan ........................... 235/470 |
| 1-152683 | 6/1989 | Japan . |
| WO89/06016 | 6/1989 | WIPO . |

OTHER PUBLICATIONS

Dickson et al., Scanner With Tandem Stationary Holographic Disc, (Jan. 1981).

Sekii et al., "Semiconductor Laser Digital Scanner", SPIE Proceedings vol. 1028, Conf. on Scanning Image, Sep. 21–23, 1988.

Fujimoto et al., "Semiconductor Laser Digital Scanner", Mar. 1990, Optical Engineering, vol. 29, pp. 230–232.

*Primary Examiner*—Donald T. Hajec
*Assistant Examiner*—Jeffrey R. Filipek
*Attorney, Agent, or Firm*—Finnegan, Henderson, Farabow, Garrett & Dunner

[57] ABSTRACT

A bar code scanner employs an electronic means for causing the light beam to scan a bar code symbol, rather than using a mechanical device to generate the scan. A linear array of light sources, activated one at a time in a regular sequence, may be imaged upon the bar code symbol to simulate a scanned beam. Instead of a single linear array of light sources, a multiple-line array may be employed, producing multiple scan lines. The multiple scan lines may be activated in sequence, or activated simultaneously (time-division or frequency-division multiplexed. The multiple scan lines can provide signal enhancement, noise reduction or fault correction if directed to the same bar code pattern. Multiple scan lines may be generated using a single light source and a beam splitter, with mechanical scanning, as well as by the sequentially-activated light sources. Multiple simultaneous scan lines may be employed to generate a raster scan at lower mechanical scan frequency. In another embodiment, a tunable laser may be employed to provide a scan without moving parts; a laser beam from the tunable laser is reflected from a diffraction grating that produces an angular deviation dependent upon the wavelength of the laser output. As the frequency of the tunable laser is varied in some selected pattern, the laser beam will scan accordingly.

22 Claims, 5 Drawing Sheets

U.S. PATENT DOCUMENTS

| | | |
|---|---|---|
| 4,460,120 | 7/1984 | Shepard et al. |
| 4,473,746 | 9/1984 | Edmonds |
| 4,481,667 | 11/1984 | Price et al. |
| 4,496,831 | 1/1985 | Swartz et al. |
| 4,548,463 | 10/1985 | Cato et al. |
| 4,591,242 | 5/1986 | Broockman et al. |
| 4,593,186 | 6/1986 | Swartz et al. |
| 4,605,846 | 8/1986 | Duret et al. |
| 4,629,876 | 12/1986 | Kubota et al. |
| 4,673,805 | 6/1987 | Shepard et al. |
| 4,698,797 | 10/1987 | Komatsu |
| 4,734,566 | 3/1988 | Senda et al. |
| 4,736,095 | 4/1988 | Shepard et al. |
| 4,743,773 | 5/1988 | Katana et al. |
| 4,758,717 | 7/1988 | Shepard et al. |
| 4,760,248 | 7/1988 | Swartz et al. |
| 4,806,742 | 2/1989 | Swartz et al. |
| 4,813,034 | 3/1989 | Mashimo |
| 4,818,856 | 4/1989 | Matsushima et al. |
| 4,897,532 | 1/1990 | Swartz et al. |
| 4,900,907 | 2/1990 | Matsushima et al. |
| 4,933,538 | 6/1990 | Heiman et al. |

FALSE DATA

5,663,549

SYSTEM FOR READING A SYMBOL BY ACTIVATING A LIQUID CRYSTAL DEVICE TO CONTROL A SCANNING PATH

This application is a divisional of U.S. patent application Ser. No. 08/098,991, filed Jul. 29, 1993 now U.S. Pat. No. 5,545,886 which is a divisional of U.S. patent application Ser. No. 07/864,367 filed Apr. 6, 1992, now U.S. Pat. No. 5,258,605, which is a continuation of U.S. patent application Ser. No. 07/493,134 filed Mar. 13, 1990, now abandoned. The U.S. patent applications are hereby incorporated by reference.

BACKGROUND OF THE INVENTION

This invention relates to bar code reader devices, and more particularly to apparatus for generating a scanned light beam for use in reading bar code symbols.

Bar code readers are disclosed in U.S. Pat. Nos. 4,387,297, 4,409,470, 4,251,798, and 4,760,248, all assigned to Symbol Technologies, Inc. The bar code readers described in these patents, as well as other devices of this type that are commercially available, usually employ oscillating mirrors or similar mechanical means to generate a scanning pattern. While such devices are widely used in retail and other business establishments today and have been quite successful in accomplishing their objectives, there is nevertheless a continuing requirement to improve reliability, reduce power consumption, reduce size and weight, lower the parts cost and manufacturing cost, and increase the speed and accuracy of operation. One of the elements of the prior bar code scanners most susceptible to improvement along these lines is the mechanical scanner device. The scanner devices may consist of a mirror mounted on a stepper motor; the mirror includes a flat portion to direct the outgoing laser beam and also a concave portion to collect reflected light and focus it upon a photodetector.

Bar code readers employ decoding circuitry to interpret the signals produced by a photodetector receiving the reflected light from the bar code symbol. Conventional decoding schemes rely upon data collected by a single scanning spot moved linearly across the field where the bar code symbol is located. The bar code data is embedded in background noise, and the decoding circuitry is more effective if the signal can be enhanced. To this end, faster scanning rates would permit the implementation of multiple scans to increase reliability of the data collected, but the mechanical scan generators previously used constrict the speed and thus place limitations on the multiple scan approach.

It is the principal object of the invention to provide a bar code reader or the like that does not require mechanical devices such as oscillating mirrors to cause a light beam to scan a symbol to be read. Another object is to provide a bar code reader that is capable of faster scan, as by implementing the scan with no moving parts. A further object is to take advantage of fast scanning techniques to provide multiple scans to thereby increase the signal recovery ability, i.e., increase the likelihood of recovering a valid decode of the bar code signal. In addition, the capability of providing multiple scans using a fast scan method permits improved facility for reading two dimensional bar code symbols of the type having multiple rows of bar code patterns. Other objects include reducing the size, weight and power consumption of a laser scan type of bar code reader, as well as reducing the manufacturing cost and increasing the reliability and operating lifetime of such devices.

SUMMARY OF THE INVENTION

In accordance with one embodiment of the invention, a bar code scanner and method are provided including structure and steps generating a scanning light beam, detecting the light beam, changing the light beam in accordance with said detected light beam, directing the light beam upon a field where the bar code symbol may be present, varying a light path of the scanning beam by changing an electrical signal applied to a liquid crystal device in the path to thereby create a scan line to traverse the field as the electrical signal changes, detecting light reflected by the field, and decoding the detected reflected light while ignoring segments of the reflected light corresponding to areas indicated as defective based on the detected scanning light beam.

BRIEF DESCRIPTION OF THE DRAWINGS

The novel features characteristic of the invention are set forth in the appended claims. The invention itself, however, as well as other features and advantages thereof, will be best understood by reference to a detailed description of specific embodiments, when read in conjunction with the accompanying drawings, wherein:

FIG. 9 is a timing diagram showing events or voltage vs. time for certain occurrences in the system of FIG. 6.

DETAILED DESCRIPTION OF SPECIFIC EMBODIMENTS

Figure 1:
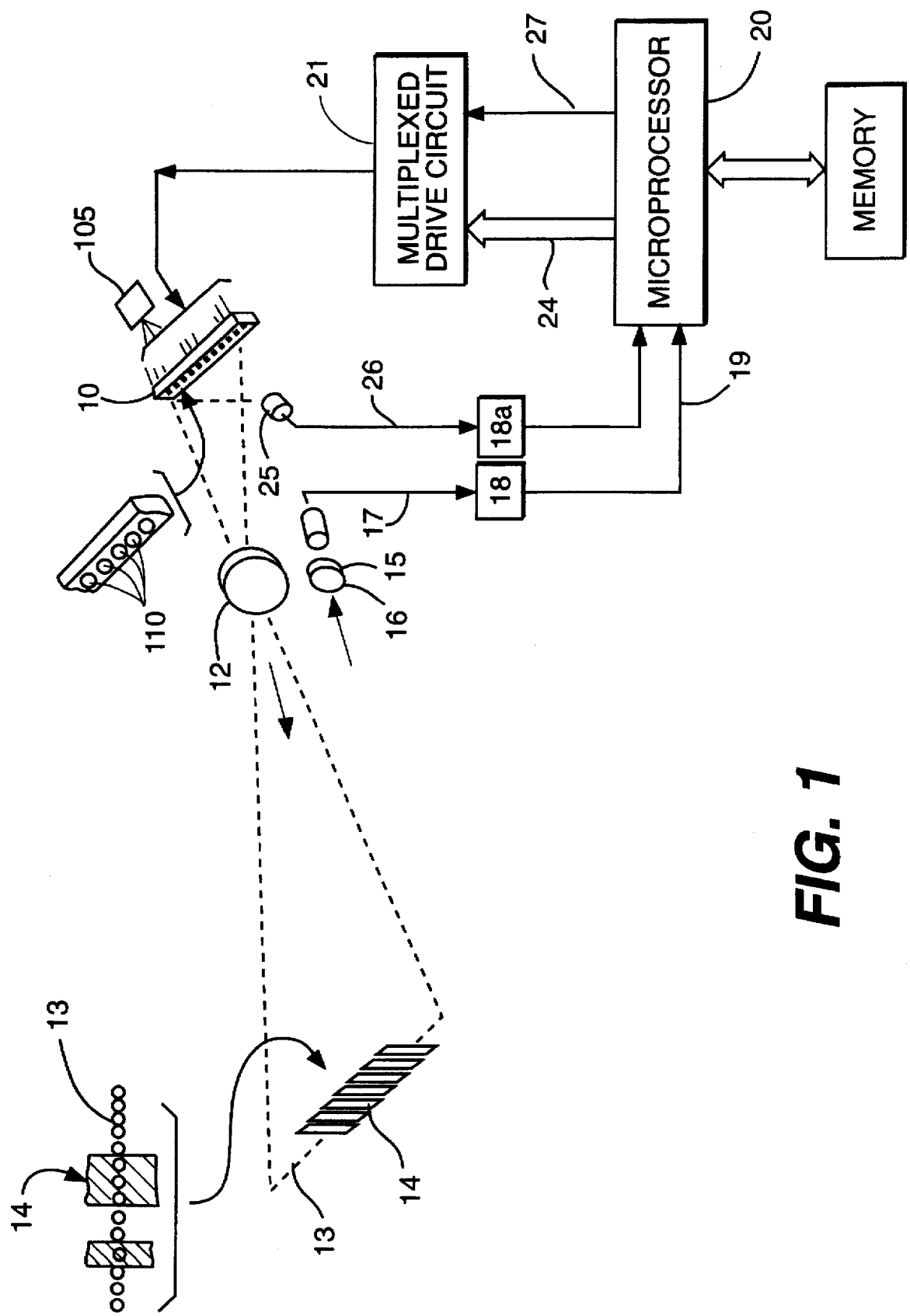
FIG. 1 is a diagram in schematic form of a bar code scanner employing a linear array of cells of a liquid crystal device of a single light source and mechanical scanning, according to one embodiment of the invention.

Referring to FIG. 1, a bar code scanner according to one embodiment of the invention employs a linear array 10 of cells of a liquid crystal device 11 that are activated one at a time in sequence. FIG. 1 includes a laser crystal device 10, a device for applying an electrical signal to the LCD or drive circuit 21 and a light source 105. The light output from the array 10 is focused by a suitable lens system 12 onto a line 13 at the focal plane of the lens system, i.e., the image of the array 10 will appear as a line 13 scanning across the focal plane. A target such as a bar code symbol 14 is scanned by the line 13, where the light beam scanning the line 13 functions just as the laser scan used in more conventional bar code readers. The advantage of the scanning arrangement of FIG. 1, however, is that there are no moving parts, and also the scan rate can be much faster than if limited by mechanical oscillating mirrors or the like. The spot size shown for the scan line 13 is merely illustrative; the actual spot size representing the images of the cells 11 may be the same size or larger than the minimum dimensions of the bars and spaces.

Figure 2:
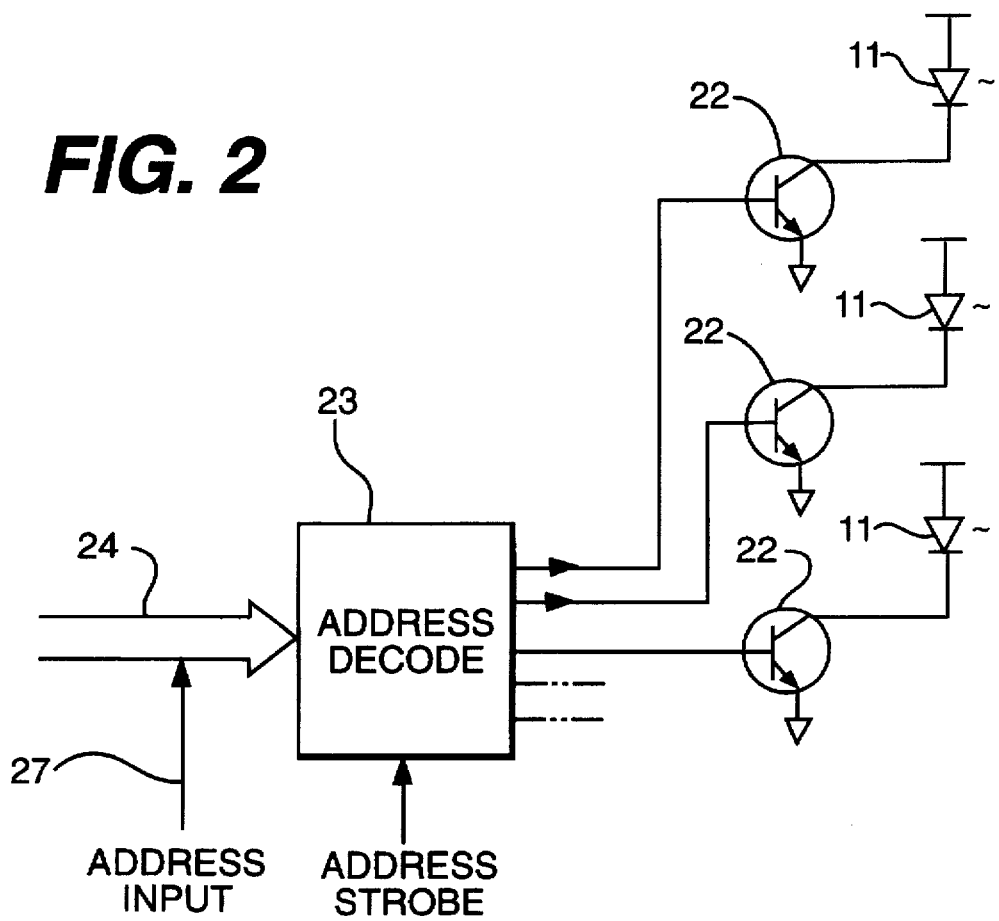
FIG. 2 is an electrical diagram in schematic form of a part of the system of FIG. 1.

Light reflected from the bar code symbol 14 is focused upon a photodetector diode 15 through a lens system 16, producing an analog electrical output serially on a line 17, and this serial output is shaped via wave-shaping circuitry 18 to produce a square-wave type of signal on a line 19 to be then decoded in the usual manner to identify the bar code symbol. A microprocessor device 20 is used to drive the array 10 by way of a multiplexed drive circuit 21, and also used to decode the detected and shaped bar code signal on the line 19. The drive circuit 21 may consist of a number of transistors 22 as seen in FIG. 2, each being connected in series with one of the cells 11 of the array 10; the base-emitter circuits of the transistors 22 are driven from a decoder 23 that receives a one-of-N address signal on lines 24 from the microprocessor 20 to activate a particular one of the cells 11; in this manner, the cells 11 can be turned on one at a time in a rapid sequence, starting at one end of the array and proceeding to the other. The pulse width used to drive the base of a transistor 22 to turn on a cell 11 may be variable by feedback based on reflected light, as described below.

Figure 3A:
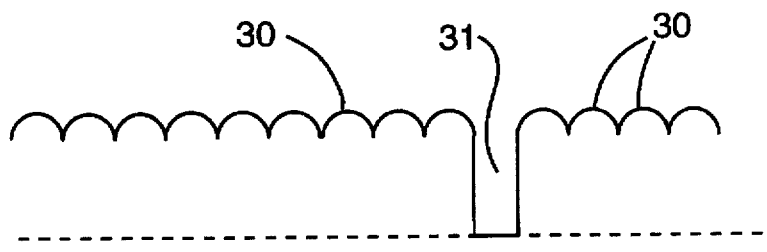
FIG. 3a–3d are timing diagrams showing events vs. time for various events or voltages in the device of FIGS. 1 and 2.
Figure 3B:
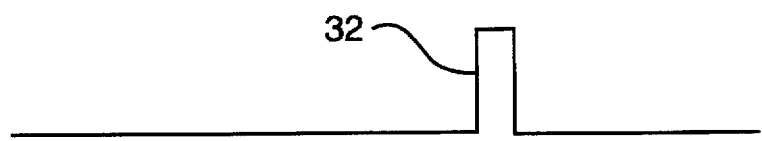
Figure 3C:
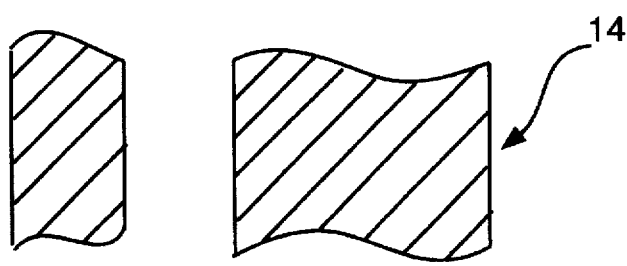
Figure 3D:
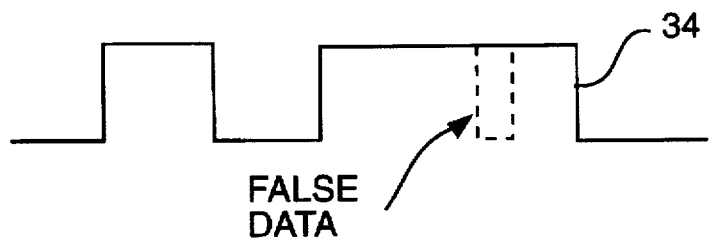

A monitoring photodiode 25 is positioned in the reader housing to detect the overall light output from the cells 11, using a suitable optic arrangement, if necessary. The electrical output from this photodiode 25 is applied by a line 26 and a wave shaper or digitizer 18a to an input of the microprocessor 20. This monitoring photodiode 25 performs several tasks. First, the output power of the cells 11 can be maintained in the proper range by adjustment of the pulse width of the driving current pulses, e.g., by an address strobe applied to the decoder 23 from the microprocessor 20 via a line 27. Feedback to adjust the pulse width used to drive the transistors 22 is thus provided. Or, the drive current for the cells 11 could be adjusted by varying the level of the power supply to the cells 11. Second, the monitoring photodiode 25 supplies an input to the microprocessor 20 for use in fault detection and correction; if one or more of the laser cells 11 is faulty and does not allow light to pass then the position or spot in the scan line 13 where this laser cell was supposed to have illuminated is always dark and so is interpreted as a black bar in the return signal even though the bar code symbol 14 actually may have a white space in this position. To prevent this incorrect interpretation, the microprocessor 20 is programmed to ignore or "blank" any signal on the input line 17 during the time slot of the faulty cell or cells. Referring to FIG. 3a, the electrical output of the monitoring photodiode 25 on line 26 should be a continuous series of overlapping or juxtaposed pulses 30, but where there is a faulty diode there will be a space 31, and so the microprocessor generates a blanking period 32 as seen in FIG. 3b. A bar code symbol 14 as seen in FIG. 3c should return a signal 33 on line 17 as seen in FIG. 3d, but the return during the blanking period 32 is false, so this input is ignored or considered to be either black or white; if the code can be decoded with this ambiguity, then a valid reading is possible, if not, then a false reading is at least avoided and another shot by the user, or an automatic rescan without user intervention, may produce a valid reading. In any event, a fault can be signalled so the user can return the reader unit for repair.

Figure 4:
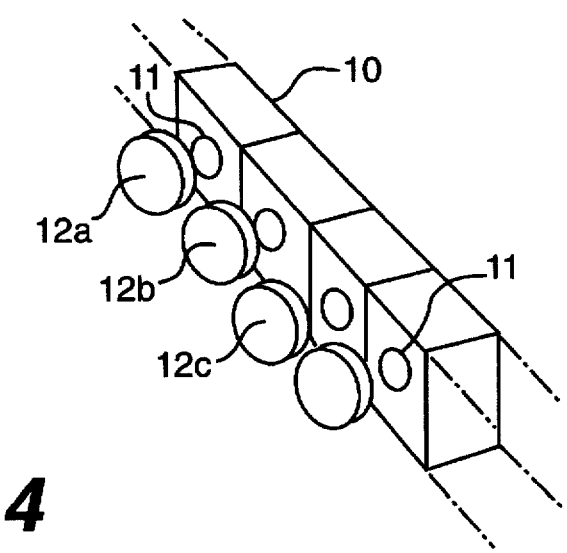
FIG. 4 is an enlarged view of a part of the linear array of light sources of FIG. 1, according to another embodiment.

As seen in FIG. 4, the optical system used to focus the array 10 upon the focal plane of the bar code symbol 14 may employ a large number of individual lenslets 12a, 12b, etc., one for each cell 11, for collimating the light from each diode. Each of the lenslets 12a, 12b, etc., is individually positioned to collimate the light for one cell, then a lens 12 is used to focus a single spot for each diode onto the focal plane where the bar code symbol 14 is expected to be, to thereby create the line 13 of spots as before.

Figure 5:
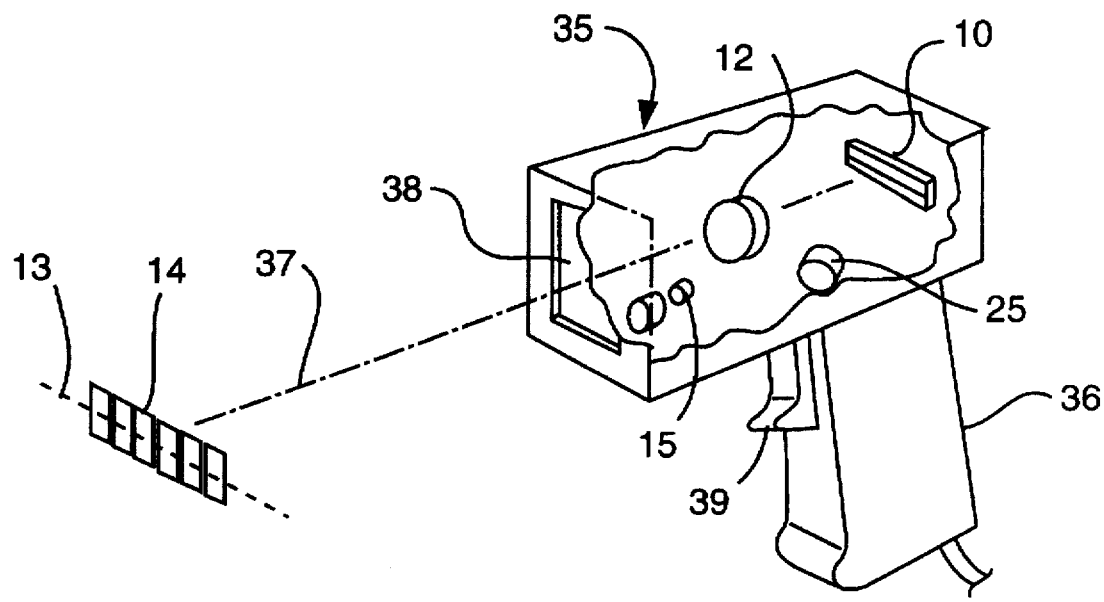
FIG. 5 is a pictorial view, partly broken away, of the device of FIGS. 1–4 mounted in a hand-held portable bar code reader unit.

Referring now to FIG. 5, the bar code scanner of FIGS. 1–4 may be mounted in a portable hand-held unit 35 having a handle 36 gripped by the user. The laser scan beam 37 generated by the linear array 10 exits through a window in the front of the unit, and the reflected light from the bar code symbol 14 also enters by this window to reach the photodetector 15. The microprocessor 20 and other circuitry of FIGS. 1 and 2 are mounted on a circuit board within the unit 35, as well as a battery if the unit is self-powered. The unit 35 is coupled to a central station by an RF link or by a wire cable. A finger-activated trigger switch 39 is employed to activate the scan, detect and decode functions when the user points the unit 35 toward a symbol 14.

Using the scanner device of FIGS. 1–5 with no moving parts, the scan pattern can be flexibly adapted; for example, if the bar code is recognized to occupy only a fraction of the full scan line 13, power can be conserved by applying drive current only to the transistors 22 for cells 11 that actually illuminate the bar code symbol 14 itself. Similarly, more scans can be applied to a small portion of the bar code symbol by limiting the addressing applied to the multiplex drive circuit 15 if decoding of the signal on line 17 indicates an ambiguity for this portion.

Figures 6, 7:
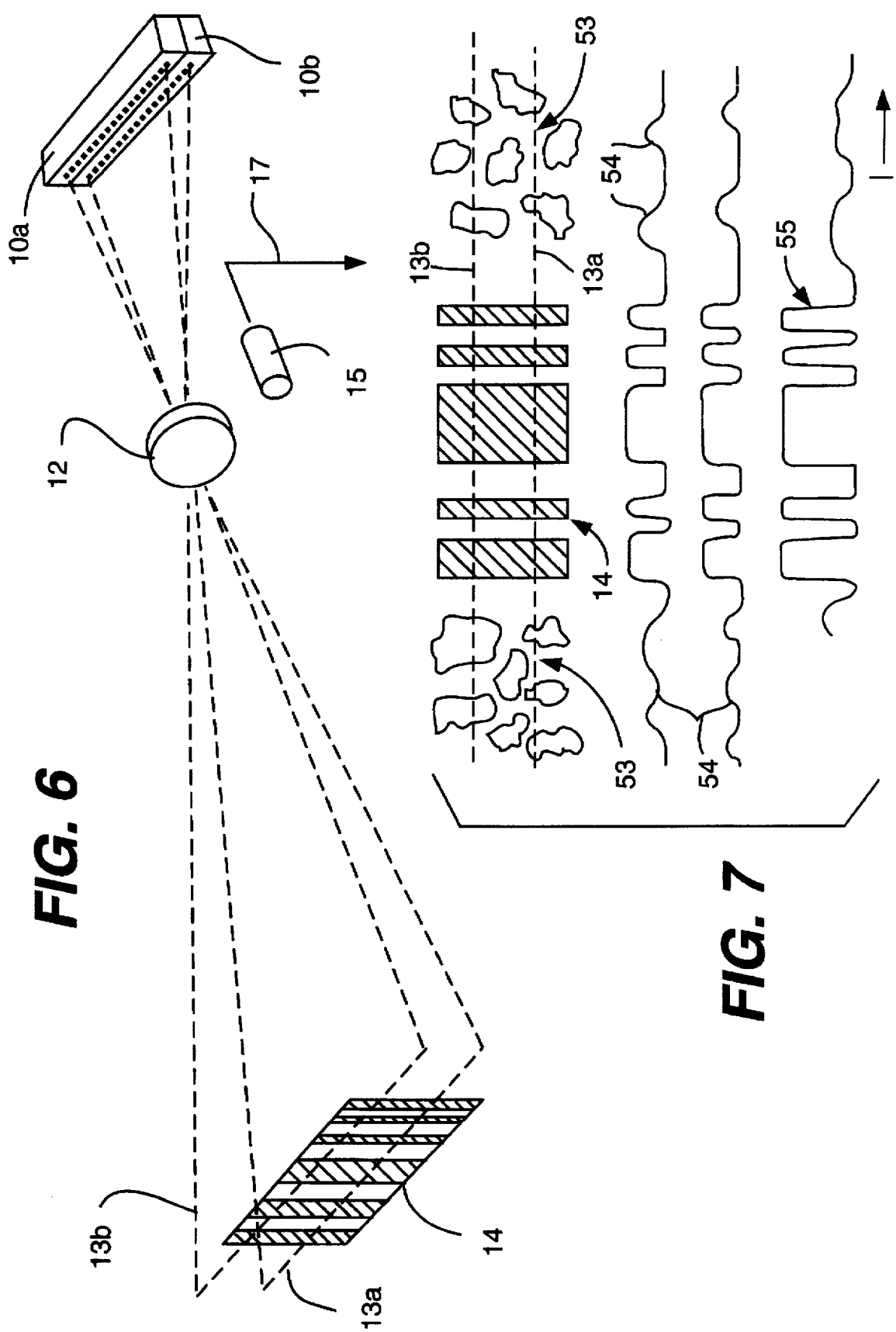
FIG. 6 is a diagram in schematic form of a bar code scanner employing dual arrays of light sources instead of a single array as in FIG. 1, according to another embodiment of the invention.
FIG. 7 is a timing diagram showing events or voltage vs. time for certain occurrences in the system of FIG. 7 illustrating the cancellation of background noise.
Figure 8:
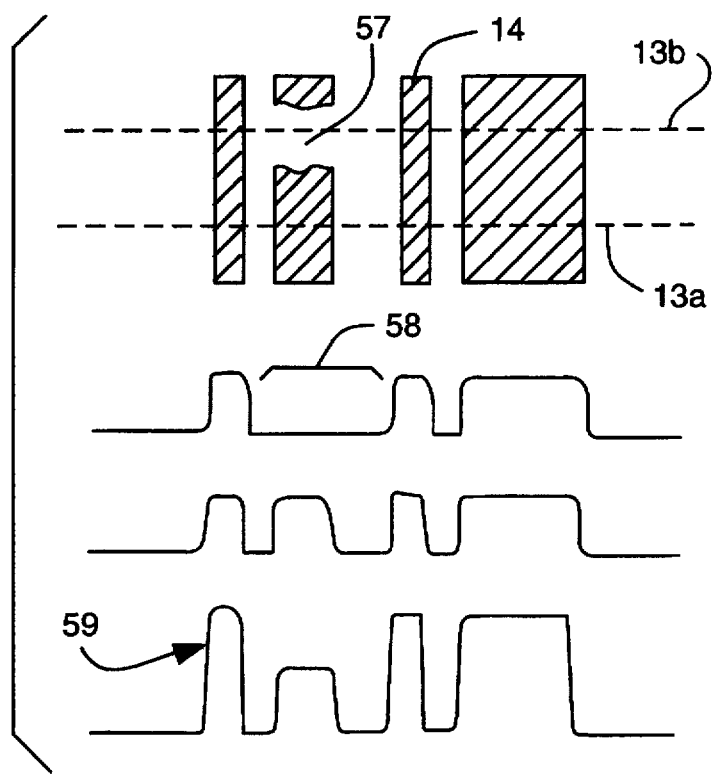
FIGS. 8 and 9 are timing diagrams showing events or voltage vs. time for certain occurrences in the system of FIG. 6 illustrating compensation for faults in the bar code.
Figure 9:
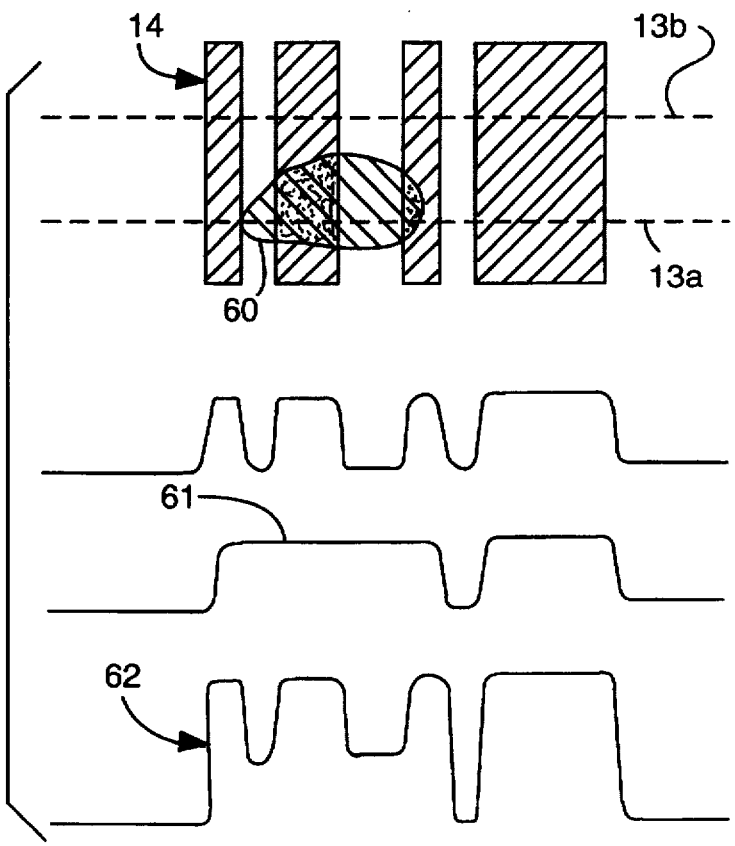

Referring to FIG. 6, another embodiment of the invention is illustrated wherein two of the linear arrays 10 and 10b are employed instead of only one as was the case in the embodiment of FIG. 1. The construction of the remaining parts of the system are the same as in FIG. 1. Use of two arrays 10a and 10b provides two scan lines 13a and 13b, one above the other, separated from one another by a distance corresponding to the physical separation of the arrays 10a and 10b and the magnification in the optical system 12. This dual scan line technique may be advantageously employed in several ways. First, if the two rows of cells 11 in the two arrays 10a and 10b are activated in parallel, in the same sequence, then the two scan lines 13a and 13b are likewise in sync; in this case if the two scan lines traverse the same bar code symbol 14, the reflected light received by the photodetector 15 is also in sync from the two scans 13a and 13b. The advantage of having two scan lines may be understood by reference to FIG. 7, where the background areas 53 are seen to return uncorrelated signals 54, whereas the bar code symbol returns correlated waveforms from the two parts of the symbol 14 being scanned by the two scan lines 13a and 13b. The single detector 15 collects reflected light from the two scans at the same time and sums the intensities of the reflections, so the contrast of the overall signal 55 detected from the bar code 14 is enhanced. On the other hand, the areas 53 outside the bar code symbol 14 will result in different signals, and so the overall contrast from these areas is reduced. The digitizing circuitry used to shape the analog waveform on the line 17 and recover the bar code information can more readily distinguish the transitions in the bar code region of the signal from the uncorrelated returns from the areas 53. Referring to FIGS. 8 and 9, another advantage to the dual scans of FIG. 7 is that bar code imperfections can be compensated for. If the bar code symbol 14 has a defect in the form of a gap 57 as seen in FIG. 8, then the signal returned by the scan line 13b would have a corresponding false area 58 whereas the return from the scan line 13a would be valid. The composite signal 59 on the line 17 at the output of the photodiode 15 would still be able to be interpreted to recover valid data. Similarly, as illustrated in FIG. 9, if the defect is in the form of a black spot 60, the light return for one scan line will have a false area 61 appearing as if there was a very wide bar in the symbol, but the composite electrical signal 62 representing the sum of both scans 13a and 13b has distinct transitions and can be decoded to produce valid bar code data.

When two scan lines 13a and 13b are used as illustrated in FIG. 6 the scan lines should be perpendicular to the individual bars of the symbol 14. The permissible misalignment depends upon the bar code density and the amount of physical separation between the two scan lines 13a and 13b.

Although according to various features of the invention the scan generation may use oscillating mirrors, the embodiments of bar code scanner devices as with no moving parts as described above have several advantages for some purposes, when compared to scanners that use electromechanical components. First, the scan rate can be much faster, so the amount of time the laser is on can be reduced, lowering power drain. The faster speed will also allow a large number of scans to be accomplished for one "read" operation, then the data signals correlated with one another using a suitable algorithm to increase the precision of the decode. Second, the scan pattern can be flexibly adapted, i.e., the scan can be tailored to fit the particular bar code symbol and position; e.g., after an initial scan it is determined that the location and width of the bar code symbol in the field of view is at a specific place, and so the field is re-scanned at only this location, which will use less power. Third, after an initial scan there can be a re-scan of only a small part that showed an ambiguous decode, attempting to get a valid decode of only the troublesome part. Fourth, improvements in reliability can be provided in a device with no moving parts but instead implemented with only electronic components and fixed optical devices.

In another aspect, the bar code scanner methods disclosed above wherein multiple scan lines are employed provide other features of importance. The reliability of the decoding process can be enhanced by producing a composite signal from multiple simultaneous scans, where the effects of noise or defects can be minimized. Or, the increased scanning speed permitted by the use of no moving parts allows the multiple scans to be sequential, one line at a time, which allows the reflected light from the multiple scan lines to be separated when using only one photodetector; this arrangement permits scanning of multiple-row bar code symbols or the like.

While this invention has been described with reference to specific embodiments, this description is not meant to be construed in a limiting sense. Various modifications of the disclosed embodiments, as well as other embodiments of the invention and variations in the character of the disclosed or other embodiments, will be apparent to persons skilled in the art upon reference to this description. It is therefore contemplated that the appended claims will cover any such modifications or embodiments, or variations therein, as fall within the true scope of the invention.

What is claimed is:

1. A method of reading a bar code symbol comprising the steps of:

generating a scanning light beam;

detecting said light beam;

changing the light beam in accordance with said detected light beam;

directing said light beam upon a field where said bar code symbol may be present;

varying a light path of said scanning beam by changing an electrical signal applied to a liquid crystal device in said path to thereby create a scan line to traverse said field as the electrical signal changes;

detecting light reflected by said field; and decoding said detected reflected light while ignoring segments of the reflected light corresponding to areas indicated as defective based on the detected scanning light beam.

2. A method of reading a bar code symbol according to claim 1 further including steps for:

detecting the light reflected from the field; and decoding the bar code symbol in response to the detected light.

3. A method of reading a bar code symbol according to claim 1 further including steps for:

determining whether the scanning light beam is at a predetermined power level in response to the detected light beam;

detecting the light reflected from the field;

determining, when the scanning light is not at a predetermined power level, whether the bar code symbol can be successfully decoded based upon the detected reflected light; and rescanning the bar code symbol when it is determined that the bar code symbol can not be successfully decoded.

4. A method of reading a bar code symbol according to claim 1 further including steps for:

determining whether the scanning light beam is at a predetermined power level in response to the detected light beam;

detecting the light reflected from the field;

determining, when the scanning light is not at a predetermined power level, whether the bar code symbol can be successfully decoded based upon the detected reflected light; and signaling an error to a user when it is determined that the bar code symbol can not be successfully decoded.

5. A method of reading a bar code symbol according to claim 1 further including the steps of:

recognizing that a bar code symbol occupies a fraction of said field; and directing the scanning light beam at the fraction of the field containing the bar code symbol.

6. A method of reading a bar code symbol comprising the steps of:

generating a light beam scan line by sequentially activating an array of cells in a liquid crystal device;

detecting the generated light beam scan line;

changing an electrical signal applied to the liquid crystal device in accordance with the detected light beam scan line to thereby adjust the light beam;

directing the light beam scan line to a field where said bar code symbol may be present;

detecting light reflected from said field to produce an electrical signal corresponding to said scan line; and decoding said electrical signal while ignoring segments of the reflected light corresponding to areas indicated as defective based on the detected generated light beam.

7. A method according to claim 6 further including the steps of:

generating a plurality of light beam scan lines; and varying the number of said plurality of light beam scan lines by varying the magnitude or frequency of a voltage applied to said liquid crystal device.

8. A method of reading a bar code symbol according to claim 6, further including a step of decoding the bar code symbol in response to the detected reflected light.

9. A method of reading a bar code symbol according to claim 6 wherein the step of generating a light beam scan line includes the step of activating the liquid crystal device in a sequence starting at one end of the array to the other end of the array.

10. A method of reading a bar code symbol according to claim 6 further including the steps of:

recognizing that a bar code symbol occupies a fraction of said field; and directing the light beam scan line at the fraction of the field containing the bar code symbol.

11. A bar code symbol reader comprising:

a light source for generating a scanning light beam;

a first photodetector for detecting the generated scanning light beam;

means for adjusting the light beam in accordance with the detected light beam;

a lens for directing the light beam upon a field where said bar code symbol may be present;

means for varying a light path of said scanning beam by changing an electrical signal applied to a liquid crystal device in said path to thereby create a scan line to traverse said field as the electrical signal changes;

means for detecting light reflected by said field; and means for decoding said detected reflected light while ignoring segments of the reflected light corresponding to areas indicated as defective based on the detected scanning light beam.

12. A bar code symbol reader according to claim 11 further including:

a second photodetector for detecting the light reflected from the field; and means for decoding the bar code symbol in response to the detected reflected light.

13. A bar code reader according to claim 11 further including:

means for determining whether the scanning light beam is at a predetermined power level in response to the detected light beam;

a second photodetector for detecting the light reflected from the field;

means for determining, when the scanning light is not at a predetermined power level, whether the bar code symbol can be successfully decoded based upon the detected reflected light; and means for rescanning the bar code symbol when it is determined that the bar code symbol can not be successfully decoded.

14. A bar code symbol reader according to claim 11 further including:

means for determining whether the scanning light beam is at a predetermined power level in response to the detected light beam;

a second photodetector for detecting the light reflected from the field;

means for determining, when the scanning light is not at a predetermined power level, whether the bar code symbol can be successfully decoded based upon the detected reflected light; and means for signalling an error to a user when it is determined that the bar code symbol can not be successfully decoded.

15. A bar code symbol reader according to claim 11 wherein the means for varying the light path includes a microprocessor.

16. A bar code symbol reader according to claim 11 further including:

means for recognizing that a bar code symbol occupies a fraction of said field; and means for directing the scanning light beam at the fraction of the field containing the bar code symbol.

17. A bar code symbol reader comprising:

a light source for generating a light beam;

an electrical source for generating a scan line by sequentially activating a plurality of cells in a liquid crystal device;

a first photodetector for detecting the generated scan line;

means for changing an electrical signal applied to the liquid crystal device based upon the detected scan line;

a lens for directing the light beam scan line to a field where said bar code symbol may be present;

a second photodetector for detecting light reflected from said field to produce an electrical signal corresponding to said scan line; and means for decoding said detected reflected light ignoring segments of the reflected light corresponding to areas indicated as defective based on the detected generated scan line.

18. The bar code symbol reader of claim 17 wherein the liquid crystal device outputs a plurality of scan lines.

19. The bar code symbol reader of claim 18 wherein the magnitude and frequency of the electrical signal controls the number of scan lines output by the liquid crystal device.

20. The bar code reader according to claim 18 further including means for varying the number of the plurality of light beam scan lines by varying a voltage applied to the liquid crystal device.

21. A bar code symbol reader according to claim 17 further including means for decoding the bar code symbol in response to the electrical signal.

22. A bar code symbol reader according to claim 17 further including:

means for recognizing that a bar code symbol occupies a fraction of said field; and means for directing the generated light beam at the fraction of the field containing the bar code symbol.

* * * * *

UNITED STATES PATENT AND TRADEMARK OFFICE
CERTIFICATE OF CORRECTION

PATENT NO. : 5,663,549
DATED      : September 2, 1997
INVENTOR(S) : Katz, et. al.

It is certified that error appears in the above-identified patent and that said Letters Patent is hereby corrected as shown below:

Title page, item [54] and col. 1, line 2, "ACTIVITATING" should read--ACTIVATING--.

Signed and Sealed this

Twenty-third Day of December, 1997

Attest:

BRUCE LEHMAN

Attesting Officer    Commissioner of Patents and Trademarks